(12) United States Patent
Go et al.

(10) Patent No.: US 12,508,292 B2
(45) Date of Patent: Dec. 30, 2025

(54) METHOD FOR PRODUCING SARCOPENIA-INHIBITING FOOD PRODUCT, SARCOPENIA-INHIBITING FOOD PRODUCT, AND MUSCLE-ENHANCING FOOD PRODUCT

(71) Applicants: KOHKAN PHARMACEUTICAL INSTITUTE CO., LTD., Tokyo (JP); TOKUSHIMA UNIVERSITY, Tokyo (JP)

(72) Inventors: Akiteru Go, Tokyo (JP); Yoshihiro Uto, Tokushima (JP)

(73) Assignees: KOHKAN PHARMACEUTICAL CO., LTD., Tokyo (JP); TOKUSHIMA UNIVERSITY, Tokushima (JP)

( * ) Notice: Subject to any disclaimer, the term of this patent is extended or adjusted under 35 U.S.C. 154(b) by 0 days.

(21) Appl. No.: 18/708,128

(22) PCT Filed: Jun. 30, 2022

(86) PCT No.: PCT/JP2022/026232
§ 371 (c)(1),
(2) Date: May 7, 2024

(87) PCT Pub. No.: WO2023/084839
PCT Pub. Date: May 19, 2023

(65) Prior Publication Data
US 2024/0335491 A1 Oct. 10, 2024

(30) Foreign Application Priority Data
Nov. 12, 2021 (JP) .................... 2021-184844

(51) Int. Cl.
*A61K 36/258* (2006.01)
*A61K 9/00* (2006.01)
*A61P 21/00* (2006.01)

(52) U.S. Cl.
CPC .......... *A61K 36/258* (2013.01); *A61K 9/0056* (2013.01); *A61P 21/00* (2018.01)

(58) Field of Classification Search
CPC ................ A61K 36/258; A23L 35/135; A23V 2250/2124
See application file for complete search history.

(56) References Cited

U.S. PATENT DOCUMENTS 8,309,075 B2 * 11/2012 Albers .................. A23L 33/105
426/138
2019/0350953 A1 11/2019 Iguchi et al.

FOREIGN PATENT DOCUMENTS

| JP | 03-277247 A | | 12/1991 |
|---|---|---|---|
| JP | 2004-049154 A | | 2/2004 |
| JP | 2008-179620 A | | 8/2008 |
| JP | 2010-132625 A | | 6/2010 |
| JP | 2019-170250 A | * | 10/2019 |
| JP | 2019-189572 A | | 10/2019 |
| JP | 2020-026437 A | | 2/2020 |

OTHER PUBLICATIONS

Jung e al, Fermentation of Red Ginseng Extract by the Probiotic Lactobacillus plantarum KCCM 11 613P; Ginsenoside Conversion and Antioxidant Effects; Journal of Ginseng Research, 43: 20-26 (Year: 2019).*
First Office Action dated Aug. 15, 2024, corresponding to Chinese Patent Application No. 202280074526.7, with English translation thereof.
International Search Report and Written Opinion dated Aug. 30, 2022 corresponding to International Patent Application No. PCT/JP2022/026232, with English translation thereof.
Aiko Inoue et al., the Prospect of Geriatrics, "Molecular Mechanisms of Sarcopenia," the Journal of the Japan Geriatrics Society, 2018, vol. 55, 1, 13 to 24, issued on Jan. 25, 2018.
First Office Action dated Aug. 11, 2023 corresponding to Chinese Patent Application No. 111132888, with English translation thereof.
Second Office Action dated Feb. 27, 2024 corresponding to Chinese Patent Application No. 111132888, with English translation thereof.
Notice of Reasons for Refusal dated Jun. 12, 2023 corresponding to Japanese Patent Application No. 2023-520364, with English translation thereof.

(Continued)

*Primary Examiner* — Carlos A Azpuru
(74) *Attorney, Agent, or Firm* — SQUIRE PATTON BOGGS (US) LLP

(57) ABSTRACT

The present invention provides a method for producing a sarcopenia-inhibiting food product readily available to general consumers, the sarcopenia-inhibiting food product, and a muscle-enhancing food product. In order to solve this problem, this method for producing the sarcopenia-inhibiting food product performs production by fermentation of American *ginseng* using a microbial group containing at least one of lactic acid bacteria and bifidobacteria. The microbial group preferably contains lactic acid bacteria capable of growing in human intestines. The fermentation is preferably performed for 36-120 hours, inclusive. This sarcopenia-inhibiting food product and this muscle-enhancing food product contain a fermented product of American *ginseng* using a microbial group containing at least one of lactic acid bacteria and bifidobacteria.

2 Claims, 15 Drawing Sheets

(56) References Cited

OTHER PUBLICATIONS

Presentation held at "Health Food Ingredients/OEM Exhibition," Kohkan Pharmaceutical Research Institute, Launch of fermented American ginseng extract/Kouhan Pharmaceutical News, Business, Health, Beauty Products, Raw Materials, OEM Apr. 13, 2022, with English translation thereof.

Toru Tasaka et al., "Suppressing muscle atrophy effect by fermenting complex lactic acid bacteria of American ginseng," Abstracts of the 142nd Annual Meeting of the Pharmaceutical Society of Japan, Mar. 4, 2022, with English translation thereof.

The Second Office Action dated Dec. 21, 2024 corresponding to Chinese Patent Application No. 202280074526.7, with English translation thereof.

Han Fan et al., "Correlation of Testosterone, estradiol, and IL-6 levels in elderly patients with different stages of sarcopenia," Chinese Journal of Osteoporosis and Bone Mineral Salt Diseases, vol. 14, No. 1, Jan. 10, 2021, with English translation thereof.

* cited by examiner

Blank(B)

Control(C)

IGF-1 (100 μg)+dexamethasone(I)

24 hours 72 hours 120 hours

Example 2

Comparative Example 3

C control

IGF-1 (100ng)

Untreated liquid (10μg)

Fermented liquid (10μg)

METHOD FOR PRODUCING SARCOPENIA-INHIBITING FOOD PRODUCT, SARCOPENIA-INHIBITING FOOD PRODUCT, AND MUSCLE-ENHANCING FOOD PRODUCT

TECHNICAL FIELD

The present disclosure relates to a method for producing a sarcopenia-inhibiting food product, a sarcopenia-inhibiting food product and a muscle-enhancing food product.

BACKGROUND ART

With increases in health consciousness, sarcopenia is attracting attention. Sarcopenia is a phenomenon in which the muscle mass decreases due to aging and the like. Sarcopenia causes, for example, physical dysfunctions of elderly people. As a document regarding sarcopenia, Non-Patent Literature 1 is known.

CITATION LIST

Non-Patent Literature

Non-Patent Literature 1: INOUE Aiko et al., the Prospect of Geriatrics, Molecular Mechanism of Sarcopenia, the Journal of the Japan Geriatrics Society, 2018, vol. 55, 1, 13 to 24, issued on Jan. 25, 2018

SUMMARY OF INVENTION

Technical Problem

As described in Non-Patent Literature 1, sarcopenia proceeds due to aging and the like and causes significant decrease of the skeletal muscle mass. On the other hand, since a decrease of insulin-like growth factor (IGF-1) brings about a decrease of the muscle mass, there is a possibility that IGF-1 can be used for suppressing sarcopenia. However, IGF-1 is not easily available for general consumers. For this reason, a completely novel technique that is easily available for general consumers has been demanded.

An object of the present disclosure is to provide a method for producing a sarcopenia-inhibiting food product, a sarcopenia-inhibiting food product, and a muscle-enhancing food product that are easily available for general consumers.

Solution to Problem

A method for producing a sarcopenia-inhibiting food product of the present disclosure comprises producing a sarcopenia-inhibiting food product through fermentation of American *ginseng* using a microbial group containing at least one of lactic acid bacteria or bifidobacteria. The other solutions will be described later in Description of Embodiments.

Advantageous Effects of Invention

The present disclosure can provide a method for producing a sarcopenia-inhibiting food product, a sarcopenia-inhibiting food product, and a muscle-enhancing food product that are easily available for general consumers.

DESCRIPTION OF EMBODIMENTS

Hereinafter, modes for carrying out the present disclosure (referred to as embodiments) will be described with reference to the drawings. In the following description of one embodiment, other embodiments applicable to the one embodiment will also be described as appropriate. The present disclosure is not limited to the following one embodiment, and different embodiments may be combined or the embodiment may be modified as desired as long as the advantageous effects of the present disclosure are not significantly impaired. In addition, the same members are denoted by the same signs, and repetitive description is omitted. Moreover, a component having the same function is denoted by the same name. The illustrated content is only schematic, and in some cases is changed from the actual configuration or illustration of some members is omitted or modified among the drawings for the sake of illustration as long as the advantageous effects of the present disclosure are not significantly impaired.

Hereinafter, a method for producing a sarcopenia-inhibiting food product and a sarcopenia-inhibiting food product of the present disclosure will be described. Note that the muscle-enhancing food product of the present disclosure is similar to the sarcopenia-inhibiting food product of the present disclosure and can be produced in the same manner as in the method for producing a sarcopenia-inhibiting food product of the present disclosure. Hence, to the muscle-enhancing food product and the production method of the present disclosure, the description on the sarcopenia-inhibiting food product and its production method of the present disclosure can be applied, and detailed descriptions of these are omitted as appropriate.

Figure 1:
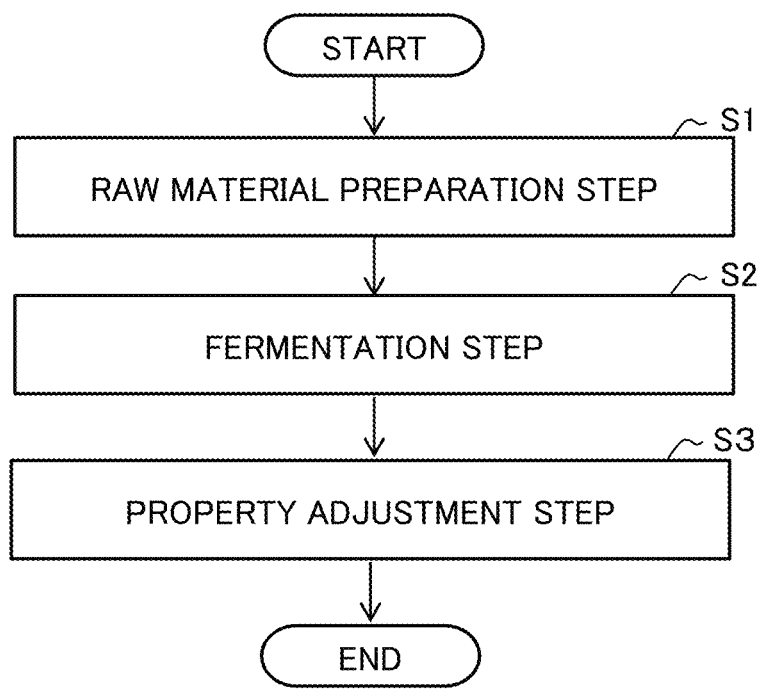
FIG. 1 is a flowchart showing a method for producing a sarcopenia-inhibiting food product and a muscle-enhancing food product of the present disclosure.

FIG. 1 is a flowchart showing the method for producing a sarcopenia-inhibiting food product and a muscle-enhancing food of the product present disclosure (hereinafter referred to as the production method of the present disclosure). The production method of the present disclosure is a method for producing a sarcopenia-inhibiting food product and a muscle-enhancing food product through fermentation of American *ginseng* using lactic acid bacteria, and includes a raw material preparation step S1, a fermentation step S2, and a property adjustment step S3.

The raw material preparation step S1 is a step of preparing a raw material to be used in the production method of the present disclosure. As the raw material, American *ginseng* (Wisconsin *ginseng*. Western *ginseng*. Scientific name; *Panax quinquefolius*) is used. By using American *ginseng*, muscle atrophy can be suppressed and muscle mass can be increased. Then, by achieving these advantageous effects, sarcopenia can be suppressed. For example, even if muscle atrophy occurs, a decrease in muscle mass can be suppressed and sarcopenia can be suppressed by increasing the muscle mass. Hereinafter, suppression of sarcopenia encompasses the meaning of muscle enhancement.

The fermentation step S2 is a step of fermenting the raw material containing American *ginseng* by using a microbial group containing at least one of lactic acid bacteria or bifidobacteria. Hereinafter, a "microbial group" simply mentioned refers to the "microbial group" mentioned here unless otherwise noted. In the fermentation step S2, for example, American *ginseng* processed into a powder form through washing and drying is used. By using a powder of American *ginseng*, the fermentation efficiency can be improved. However, the form is not limited to a powder, a chopped product, a chip, or a dried product (drying active ingredient) of American *ginseng* itself may be fermented. As the degree of cutting, for example, American *ginseng* may be processed into a size of around 0.5 cm to 1 cm×0.5 cm to 1 cm. In addition, from the viewpoint of acceleration of fermentation, for example, American *ginseng* may be processed into a paste form by grating.

American *ginseng* may be used as it is after the cutting or may be dried and then used after the cutting. In the case of a dried product, from the viewpoint of acceleration of fermentation, American *ginseng* is preferably in a powder form.

In addition to American *ginseng*, other raw materials may be used in combination.

The fermentation step S2 is a step of fermenting American *ginseng* prepared in the raw material preparation step S1, by using a microbial group. The microbial group may be any microbial group as long as the microbial group can impart a sarcopenia-inhibiting effect to a fermented product, but preferably contains at least one of lactic acid bacteria or bifidobacteria which can grow in the human intestine. By using such bacteria, it is possible to reproduce the situation where a human actually eats the sarcopenia-inhibiting food product and the muscle-enhancing food product and to exert fermentation outside the human body.

In addition, it is preferable that the microbial group contain at least one of
Bifidobacterium longum (*B. longum*),
Bifidobacterium bifidum (*B. bifidum*),
Bifidobacterium adolescentis (*B. adolescentis*),
Lactobacillus acidophilus (*L. acidophilus*),
Lactobacillus paracasei subsp. *paracasei* (*L. paracasei*),
Lactobacillus gasseri (*L. gasseri*),
Lactobacillus delbrueckii subsp. *bulgaricus* (*L. delbrueckii* (*bulgaricus*)),
Lactobacillus helveticus (*L. helveticus*),
Lactobacillus casei subsp. *casei* (*L. casei*),
Lactobacillus rhamnosus (*L. rhamnosus*),
Lactobacillus delbrueckii subsp. *delbrueckii* (*L. delbrueckii*),
Streptococcus thermophilus (*S. thermophilus*),
Lactobacillus brevis (*L. brevis*),
Lactobacillus jensenii (*L. jensenii*),
Lactococcus lactis (*L. lactis*), or
Enterococcus faecium (*E. faecium*). These microorganisms are lactic acid bacteria (*Lactobacillus*, lactic acid kou-setsu, *Lactococcus*) and bifidobacteria which can grow in the human intestine. Containing at least one of these microorganisms makes it possible to reproduce the situation where a human actually eats the sarcopenia-inhibiting food product and the muscle-enhancing food product and exert fermentation outside the human body. However, the microbial group preferably contains at least one of these but is not necessarily limited to these.

Preferable microorganisms and their scientific names are shown in Table 1.

TABLE 1

| | | |
|---|---|---|
| Bifidobacterium | B. longum | Bifidobacterium longum |
| Bifidobacterium | B. bifidum | Bifidobacterium bifidum |
| Bifidobacterium | B. adolescentis | Bifidobacterium adolescentis |
| Lactobacillus | L. acidophilus | Lactobacillus acidophilus |
| Lactobacillus | L. paracasei | Lactobacillus paracasei subsp. paracasei |
| Lactobacillus | L. gasseri | Lactobacillus gasseri |
| Lactic acid kou-setsu | L. delbrueckii (bulgaricus) | Lactobacillus delbrueckii subsp. bulgaricus |
| Lactobacillus | L. helveticus | Lactobacillus helveticus |
| Lactobacillus | L. casei | Lactobacillus casei subsp. casei |
| Lactobacillus | L. rhamnosus | Lactobacillus rhamnosus |
| Lactobacillus | L. delbrueckii | Lactobacillus delbrueckii subsp. delbrueckii |
| Lactococcus | S. thermophilus | Streptococcus thermophilus |
| Lactobacillus | L. brevis | Lactobacillus brevis |
| Lactobacillus | L. jensenii | Lactobacillus jensenii |
| Lactococcus | L. lactis | Lactococcus lactis |
| Lactococcus | E. faecium | Enterococcus faecium |

Particularly, it is preferable to use a microbial group containing all the microorganisms shown in Table 1. That is, it is preferable that the microbial group contain
Bifidobacterium longum,
Bifidobacterium bifidum,
Bifidobacterium adolescentis,
Lactobacillus acidophilus,
Lactobacillus paracasei subsp. *paracasei*,
Lactobacillus gasseri,
Lactobacillus delbrueckii subsp. *bulgaricus*,

*Lactobacillus helveticus,*
*Lactobacillus casei* subsp. *casei,*
*Lactobacillus rhamnosus,*
*Lactobacillus delbrueckii* subsp. *delbrueckii,*
*Streptococcus thermophilus,*
*Lactobacillus brevis,*
*Lactobacillus jensenii,*
*Lactococcus lactis,* and
*Enterococcus faecium,* and the fermentation by the microbial group be a symbiotic fermentation by the microbial group containing a plurality of microorganisms. The microorganisms shown in Table 1 are a combination reproducing the human gut microbiota in a pseudo manner, and by conducting fermentation in a pseudo manner like enteric fermentation in advance, fermentation products can be more efficiently utilized in the body. However, although it is preferable to use the combination of microorganisms shown in Table 1 for the fermentation, the fermentation is not limited to this combination.

The fermentation conditions are not particularly limited as long as the sarcopenia-inhibiting effect can be imparted to the fermented product, but it is preferable that the fermentation time be about a time for which a food product which a human ingests normally stays in the body (in the intestine) and is metabolized by the enteric bacteria. Specifically, for example, it is preferable that the fermentation be conducted for normally 24 hours or more, preferably 36 hours or more, more preferably 48 hours or more, and particularly preferably 60 hours or more, and the upper limit be for example 120 hours or less, preferably 96 hours or less, more preferably 84 hours or less, and particularly preferably 72 hours or less. By setting the fermentation time within this range, the fermentation can be conducted in a pseudo manner like the enteric fermentation in advance, and fermentation products can be more efficiently utilized in the body.

The fermentation temperature may be changed as appropriate depending on the type of the microbial group, but is preferably around the same temperature as the temperature in the human intestines. Specifically, for example, the fermentation temperature is normally 35° C. or more, preferably 36° C. or more, and more preferably 36.5° C. or more, and the upper limit is normally 42° C. or less, preferably 40° C. or less, and more preferably 38° C. or less. By setting this temperature, the fermentation can be conducted in a pseudo manner like the enteric fermentation in advance, and fermentation product can be more efficiently utilized in the body.

The atmosphere for the fermentation may be changed as appropriate depending on the type of the microbial group, but may be set to, for example, an anaerobic atmosphere.

The fermentation can be conducted by using a mixed slurry of the raw material and the microbial group. The mixed slurry may further contain sugars such as, for example, glucose, lactose, and oligosaccharide in addition to the raw material and the microbial group.

The property adjustment step S3 is a step of adjusting the fermented product obtained in the fermentation step S2 to a desired property as appropriate. As the desired property, in the case where the property is a dried product, for example, the fermented product which is a slurry may be dried, for example. Drying may be such that, for example, the fermented product may be dried as it is, or a solution obtained by removing solid components from the fermented product through, for example, filtration may be dried. After the drying, a product thus obtained may be ground into a desired size.

A sarcopenia-inhibiting food product and a muscle-enhancing food product of the present disclosure comprise a fermented product of American *ginseng* obtained by using a microbial group. According to the studies of the present inventors, it is considered that the sarcopenia-inhibiting effect is not achieved by a specific component only in the fermented product but is achieved as a result of interaction of the components in the fermented product. In view of this, an expression "fermented product" is used. However, it is considered that the fermented product that achieves the sarcopenia-inhibiting effect is contained in a liquid phase in the slurry obtained in the above fermentation step S2.

The sarcopenia-inhibiting food product and the muscle-enhancing food product of the present disclosure can be used for elderly people, for example. In addition, the sarcopenia-inhibiting food product of the present disclosure also achieves a muscle mass-enhancing effect in addition to the muscle atrophy-inhibiting effect. For this reason, the sarcopenia-inhibiting food product of the present disclosure can be favorably used to, for example, healthy subjects, athletes, and sports people. Focusing on the muscle mass-enhancing effect, the sarcopenia-inhibiting food product of the present disclosure can be orally fed easily as a muscle-enhancing food product. Moreover, it is also expected that the sarcopenia-inhibiting food product and the muscle-enhancing food product of the present disclosure contribute to hormone substances such as myokine secreted from the muscle.

EXAMPLES

Figure 20:
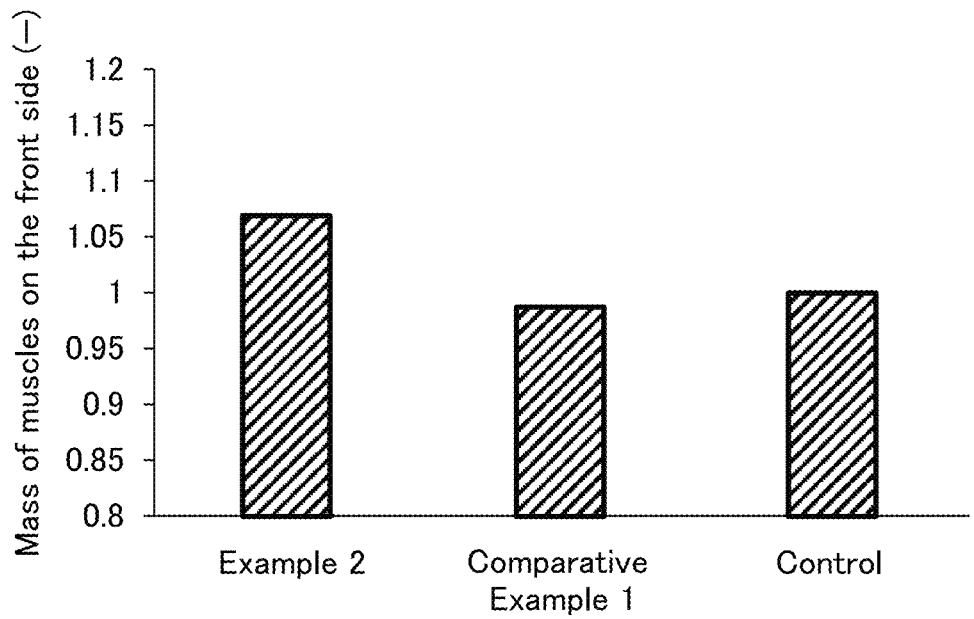
FIG. 20 is a graph showing total masses of the tibialis anterior muscle, the extensor digitorum longus muscle, and the peroneus longus muscle.
Figure 21:
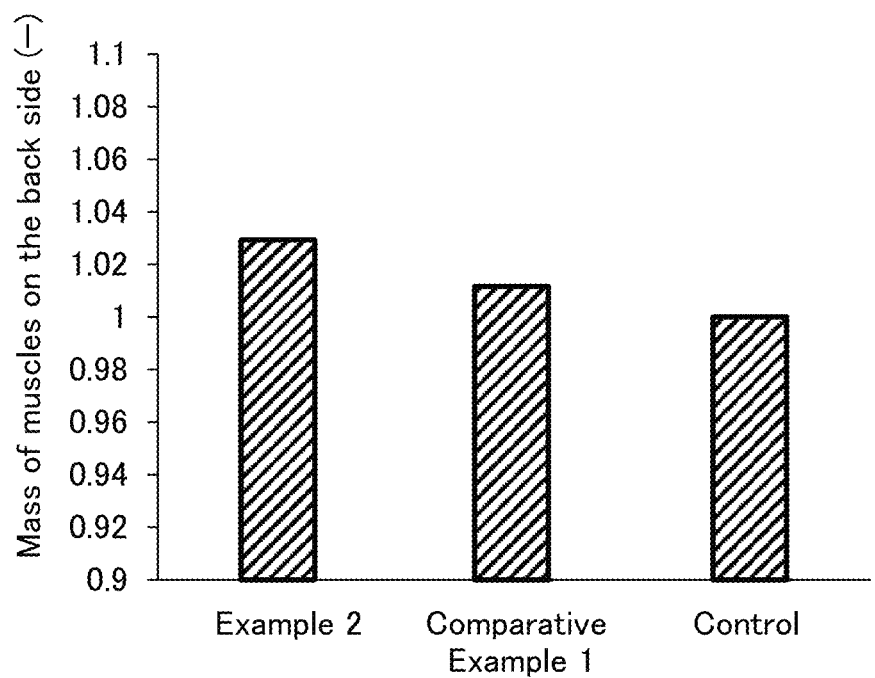
FIG. 21 is a graph showing total masses of the gastrocnemius muscle and the soleus muscle.
Figure 22:
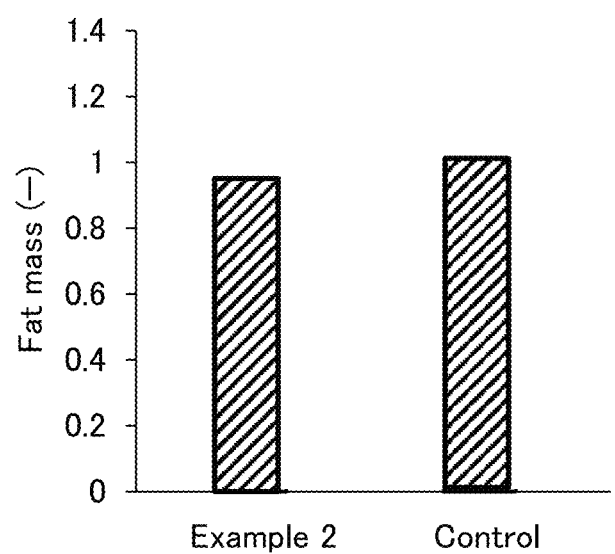
FIG. 22 is a graph showing fat masses.

Sarcopenia-inhibiting food products and muscle-enhancing food products of the present disclosure were produced in accordance with the production method of the present disclosure, and the muscle atrophy-inhibiting effect and the muscle mass-increasing effect were evaluated. Note that FIG. 20, FIG. 21, and FIG. 22 show measured values per unit mass of mice obtained by dividing measured values by body weights of the mice.

Production of Sarcopenia-Inhibiting Food Products and Muscle-Enhancing Food Products Example 1

American *ginseng* was dried and processed into a powder form (a mixture having a particle size of 10 μm to 100 μm) to prepare a raw material for microorganism fermentation (the raw material preparation step S1). Subsequently, a microbial group containing *Bifidobacterium longum, Bifidobacterium bifidum, Bifidobacterium adolescentis, Lactobacillus* acidophilus*, Lactobacillus paracasei* subsp. *paracasei, Lactobacillus gasseri, Lactobacillus delbrueckii* subsp. *bulgaricus, Lactobacillus helveticus, Lactobacillus casei* subsp. *casei, Lactobacillus rhamnosus, Lactobacillus delbrueckii* subsp. *delbrueckii, Streptococcus thermophilus, Lactobacillus brevis, Lactobacillus jensenii, Lactococcus lactis,* and *Enterococcus faecium* (a microbial group containing all the microorganisms shown in the above Table 1) was used to subject the raw material to symbiotic fermentation (the fermentation step S2). The symbiotic fermentation was conducted on a slurry obtained by suspending a mixture of the raw material and the lactic acid bacteria in water. The fermentation time was set to 24 hours, the fermentation temperature was set to 37° C., and the fermentation atmosphere was set to be anaerobic. By the symbiotic fermentation, a fermented product in slurry form was obtained. The fermented product thus obtained was filtered to remove solid components, thereby obtaining a liquid (a fermented liquid) of the sarcopenia-inhibiting food product and the muscle-enhancing food product of the present disclosure (the property adjustment step S3).

Example 2

The fermented product obtained in the fermentation step S2 was freeze-dried and ground to obtain a powder of the sarcopenia-inhibiting food product of the present disclosure (a mixture having a particle size of 10 μm to 100 μm) (the property adjustment step S3).

Comparative Example 1

A powder was obtained in the same manner as in Example 2 except that the fermentation step S2 was not conducted.

Comparative Example 2

A liquid (a fermented liquid) was obtained in the same manner as in Example 1 except that Asian *ginseng* was used instead of American *ginseng*.

Evaluation (Muscle Atrophy Inhibition, Measurement of Cell Transverse Diameter)

After myoblast cells were differentiated to myotube cells as described below, muscle atrophy was induced by using dexamethasone. When dexamethasone was added, the sarcopenia-inhibiting food product of the present disclosure was also added simultaneously, and the muscle atrophy inhibition by the sarcopenia-inhibiting food product of the present disclosure was evaluated.

First, as cell inoculation, C2C12 cells were inoculated in 24-well plates with a culture medium each in $5 \times 10^4$ cells/well. Subsequently, as differentiation and induction, after 24 hours, the medium was replaced with a differentiation medium. Moreover, after 24 hours, medium replacement was conducted, and then, after 48 hours, medium replacement was further conducted. After differentiation was confirmed, dexamethasone (10 μM) and the sarcopenia-inhibiting food product of the present disclosure or IGF-1 were added to the medium. The added amount of the sarcopenia-inhibiting food product of the present disclosure was set to 1 μg or 10 μg.

Then, 24 hours after the addition, Giemsa staining was conducted. After Giemsa staining, cells were imaged with a microscope, and the transverse diameter of myotube cells in the image was measured by using ImageJ (image processing software). Myoblast cells are fused to be differentiated to myotube cells. Myotube cells are linearly extending portions with color which contain a plurality of cores (spherical portions with dark color) in the image (FIG. 2) described later. Then, as the transverse diameter, the transverse diameter of the thickest portions of myotube cells was measured. For example, regarding the image of the blank (B) of FIG. 2 described later, among three transverse diameters L shown, the longest transverse diameter L was measured.

Figure 2:
FIG. 2 is Giemsa stained images for explaining muscle atrophy.
Figure 2:
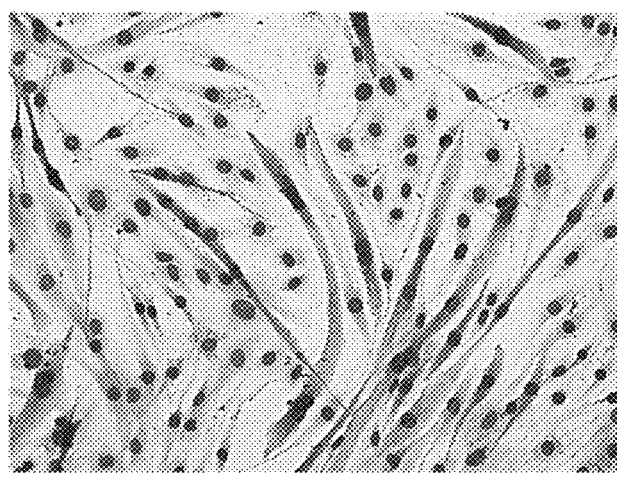
Figure 2:
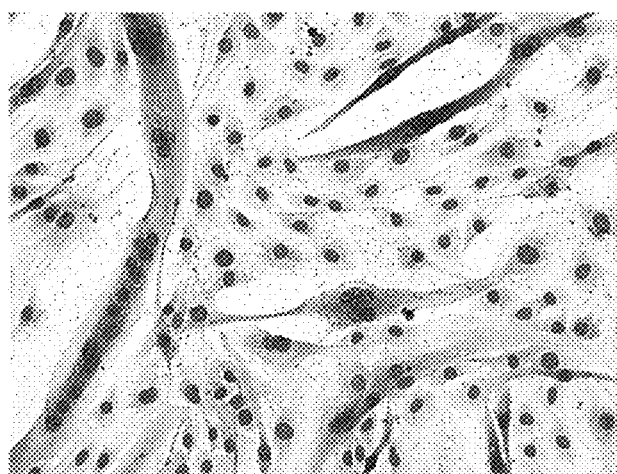

FIG. 2 is Giemsa stained images for explaining muscle atrophy. From the top, Blank (B), Control (C), and IGF-1 (100 μg)+dexamethasone (I) are shown. B is myotube cells in which muscle atrophy was not induced, C is myotube cells in which muscle atrophy was induced by adding dexamethasone, and I is myotube cells in which muscle atrophy was induced by adding dexamethasone but muscle atrophy was inhibited by IGF-1. In C, white portions decreased, so it can be seen that muscle atrophy was induced. On the other hand, in B and I, the areas of white portions were large, so it can be seen that muscle atrophy was inhibited. The results of measuring transverse diameters are shown in Table 2.

TABLE 2

| | Example 1 | | Example 2 | | Comparative Example 1 | | Comparative Example 2 | | B | C | I |
|---|---|---|---|---|---|---|---|---|---|---|---|
| Added amount (μg) | 1 | 10 | 1 | 10 | 1 | 10 | 1 | 10 | — | — | — |
| Transverse diameter (μm) | 26.27 | 33.81 | 27.16 | 31.45 | 24.89 | 27.65 | 25.85 | 26.00 | 44.01 | 23.94 | 37.68 |

Figure 3:
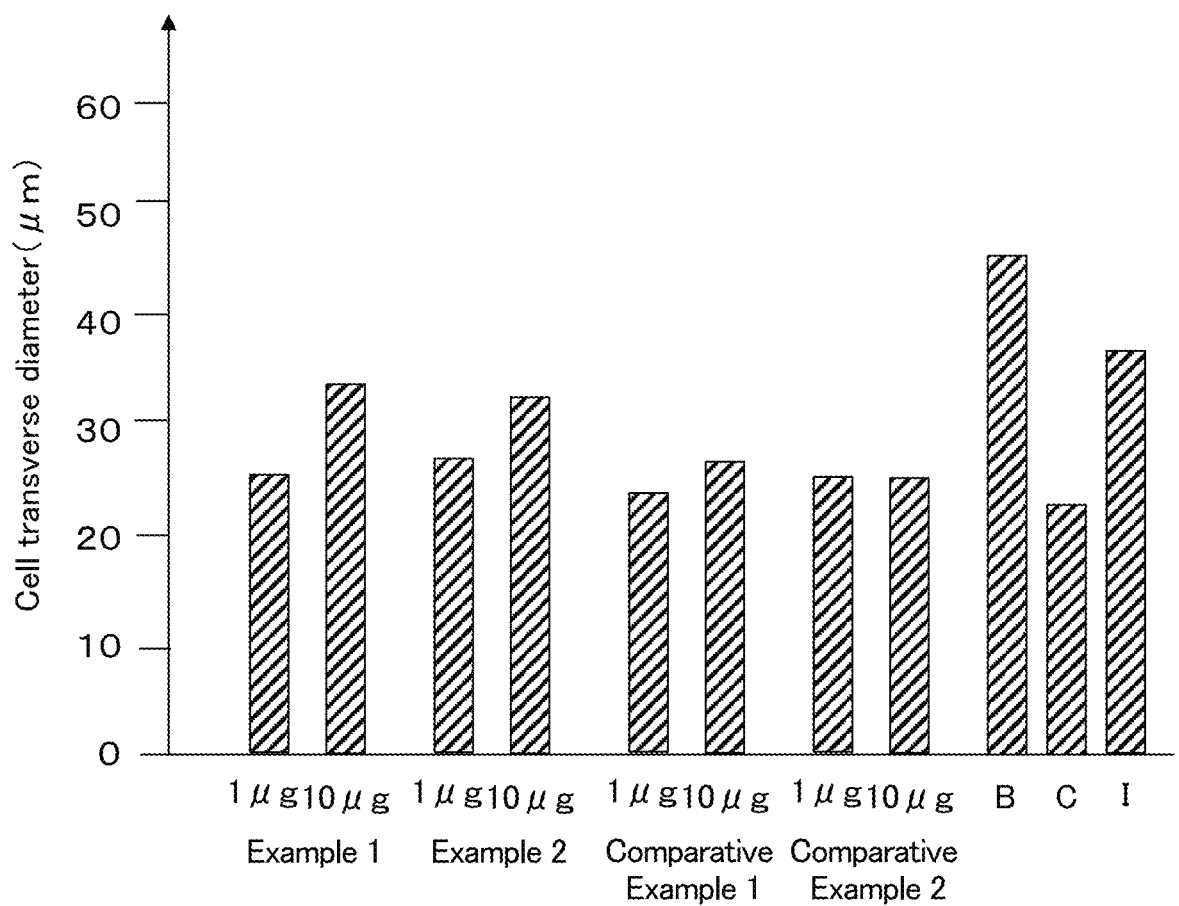
FIG. 3 is a graph showing cell transverse diameters obtained through muscle atrophy inhibition evaluation.

FIG. 3 is a graph showing cell transverse diameters obtained by the muscle atrophy inhibition evaluation. When B and C were compared, the cell transverse diameter was shortened by muscle atrophy induced by adding dexamethasone. However, as shown in I, muscle atrophy was suppressed by adding IGF-1, so that the cell transverse diameter became longer than that in C.

As shown in Examples 1 and 2, the cell transverse diameter became longer than that in C in the both cases of adding the fermented liquid (Example 1) and the powder (Example 2). From this, it was confirmed that the sarcopenia-inhibiting food product of the present disclosure suppressed (alleviated) muscle atrophy. Particularly, in the case where 10 μg of each was added, the cell transverse diameter became a length close to the cell transverse diameter of I, which used IGF-1, and it was confirmed that the inhibition effect was large.

On the other hand, Comparative Examples 1 and 2 were both at levels similar to C. Note that in Comparative Example 1, in the case where 10 μg was added, the cell transverse diameter became longer than the case where 1 μg was added. However, in consideration of a measurement error between the items of 1 μg and 10 μg, it can be said that there was hardly a change. Therefore, it was confirmed that muscle atrophy was inhibited only by fermented American *ginseng*, and in the case where American *ginseng* was not fermented and in the case where Asian *ginseng* was used, such advantageous effect was not exhibited.

Figure 4:
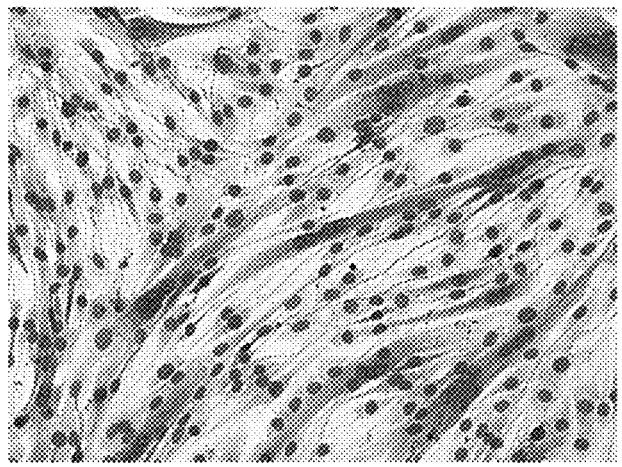
FIG. 4 is Giemsa stained images for explaining muscle atrophy and results in the case where the fermentation time was changed.
Figure 4:
Figure 4:
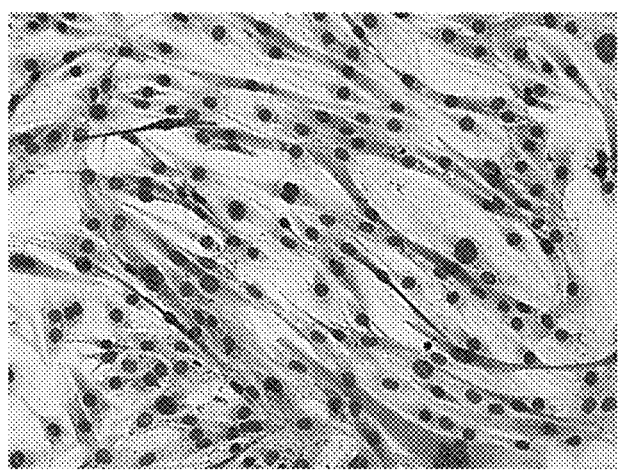

FIG. 4 is Giemsa stained images for explaining muscle atrophy, and shows results in the case where the added amount was fixed to 10 μg and the fermentation time was changed. From the top, images in the case where the fermentation time was changed to 24 hours, 72 hours, and 120 hours in Example 1 are shown. All the cases contained dexamethasone. The longer the fermentation time was, the longer the cell transverse diameter became. However, the cases of 72 hours and 120 hours appear to be similar levels. Results of measuring transverse diameters are shown in Table 3.

TABLE 3

|  | Fermentation time | | | | | |
| --- | --- | --- | --- | --- | --- | --- |
|  | 24 hours | 72 hours | 120 hours | B | C | I |
| Added amount (μg) | 10 | 10 | 10 | — | — | — |
| Transverse diameter (μm) | 30.45 | 35.84 | 27.32 | 49.76 | 24.92 | 40.21 |

Figure 5:
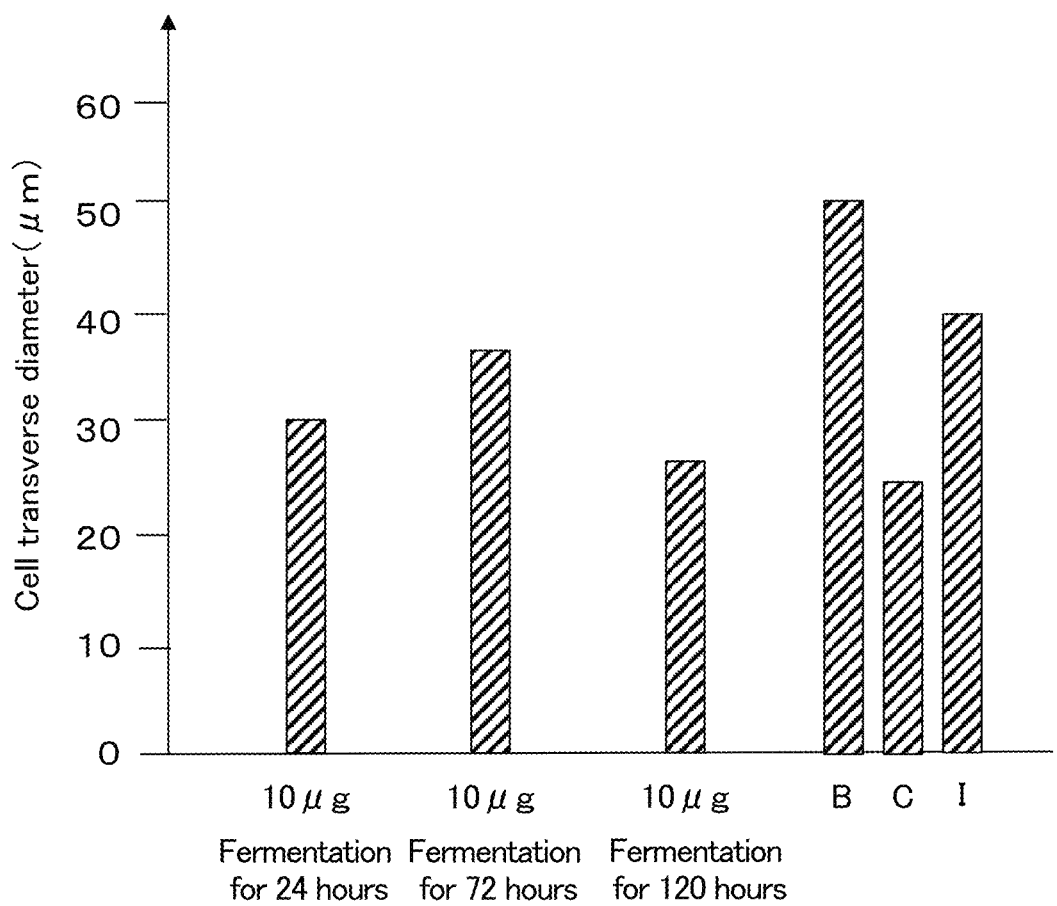
FIG. 5 is a graph showing cell transverse diameters obtained by evaluating muscle atrophy-inhibiting effects and results in the case where the fermentation time was changed.

FIG. 5 is a graph showing cell transverse diameters obtained by evaluating the muscle atrophy-inhibiting effect, and shows results in the case where the fermentation time was changed. As described with reference to FIG. 4, the longer the fermentation time is, the longer the cell transverse diameter becomes. However, there is a tendency that the cell transverse diameter reaches a peak when the fermentation time is made long to some extent. For example, when 24 hours and 72 hours are compared, the cell transverse diameter is longer in 72 hours. However, when 72 hours and 120 hours are compared, although both were longer than C, the cell transverse diameter in 120 hours was shorter than that in 72 hours. It is considered that this result occurred because the increase in fermentation time caused unintended reactions, which reduced the muscle atrophy-inhibiting effect. For this reason, it was found that it is preferable to conduct the fermentation for 36 hours or more and 120 hours or less, and particularly, it is more preferably to conduct the fermentation for 36 hours or more and 96 hours or less.

Evaluation (Muscle Atrophy Inhibition, Check of Muscle Atrophy Marker)

The expression level of a muscle atrophy marker was examined. In the above "Evaluation (Muscle Atrophy Inhibition, Measurement of Cell Transverse Diameter)", 24 hours after dexamethasone (10 μM) and the sarcopenia-inhibiting food product of the present disclosure or IGF-1 were added, cells were collected. The added amount was set to 10 μg. For the cells thus collected, the expression level of the muscle atrophy marker (Murf-1, Atrogin) was measured. The expression levels are shown in Table 4.

TABLE 4

|  | Example 1 | Comparative Example 1 | B | C | I |
| --- | --- | --- | --- | --- | --- |
| Added amount (μg) | 10 | 10 | — | — | — |
| Murf-1 | 0.61 | 0.90 | 0.36 | 1.00 | 0.50 |
| Atrogin | 0.64 | 0.96 | 0.35 | 1.00 | 0.46 |

Figure 6:
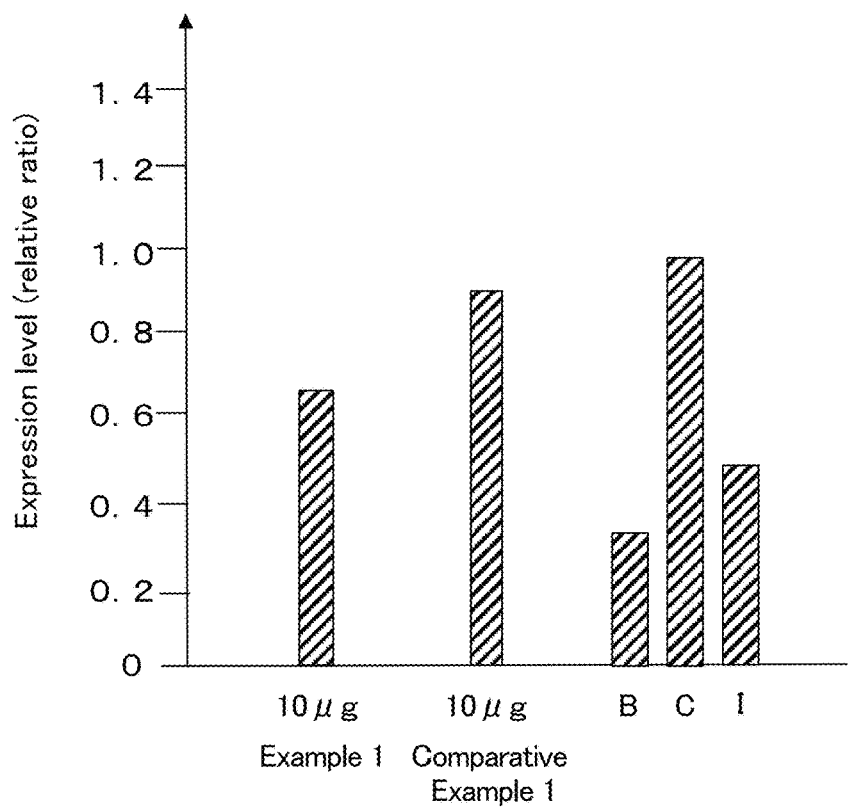
FIG. 6 is a graph showing expression levels of Murf-1.
Figure 7:
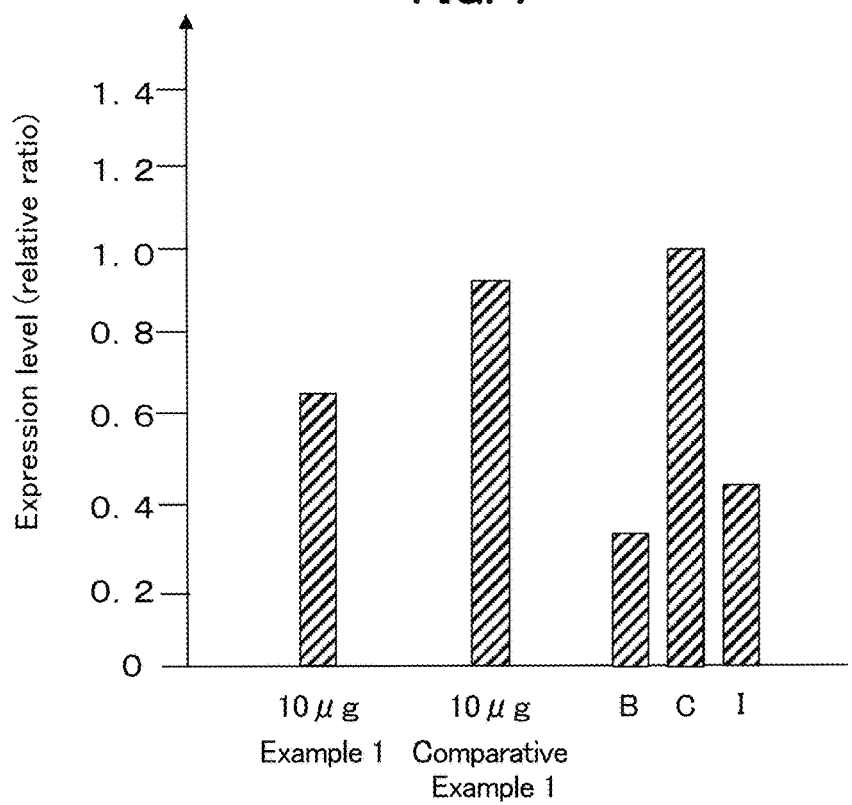
FIG. 7 is a graph showing expression levels of Atrogin.

FIG. 6 is a graph showing expression levels of Murf-1. In addition, FIG. 7 is a graph showing expression levels of Atrogin. It is indicated that with a larger numerical value, the expression of muscle atrophy-related gene increased. Therefore, it is preferable that the numerical value be small. The expression level of Example 1 is a result obtained by adding the sarcopenia-inhibiting food product of the above Example 1 to the medium, and the expression level of Comparative Example 1 is a result obtained by adding American ginseng (not fermented) of the above Comparative Example 1 to the medium.

From the results of FIG. 6 and FIG. 7, it was found that muscle atrophy was suppressed by the sarcopenia-inhibiting food product of the present disclosure due to inhibition of the expression of the muscle atrophy marker.

Evaluation (Muscle Atrophy Inhibition, Measurement of Atrophy Amount)

Muscle atrophy of model mice was evaluated in accordance with the following method. The test animals were C57BL/6J mice (8-week old, male). The test method was conducted by excising sciatic nerves of one leg of each mouse, creating muscle atrophy models, and comparing the muscle wet mass with Sham. Note that Sham represents sham surgery, and was applied to a leg in which the sciatic nerve was not excised. In excising the sciatic nerves, the muscle of one lower limb of the mouse was cut open, and nerves were excised. The Sham was conducted on the other lower limb by cutting open the muscle (but not cutting the nerves) to apply the same stress as in the excision group for setting the same conditions.

As administration groups, control (C) was only a powder sample, Example 2 was a mixed powder of the powder sample and the sarcopenia-inhibiting food product (in a content of 3% by mass) of Example 2, and Comparative Example 3 was a mixed powder of the powder sample and a dried powder of American ginseng (in a content of 3% by mass). These powders were orally fed to mice. The test schedule was such that after acclimation for one week, the start of administrating the samples was set as the 1st day, the sciatic nerves were excised on the 15th day, and the muscles were collected on the 25th day. The collections of the muscles were made such that the tibialis anterior muscle, the extensor digitorum longus muscle, and the peroneus longus muscle were collected and the masses thereof were measured.

Figure 8:
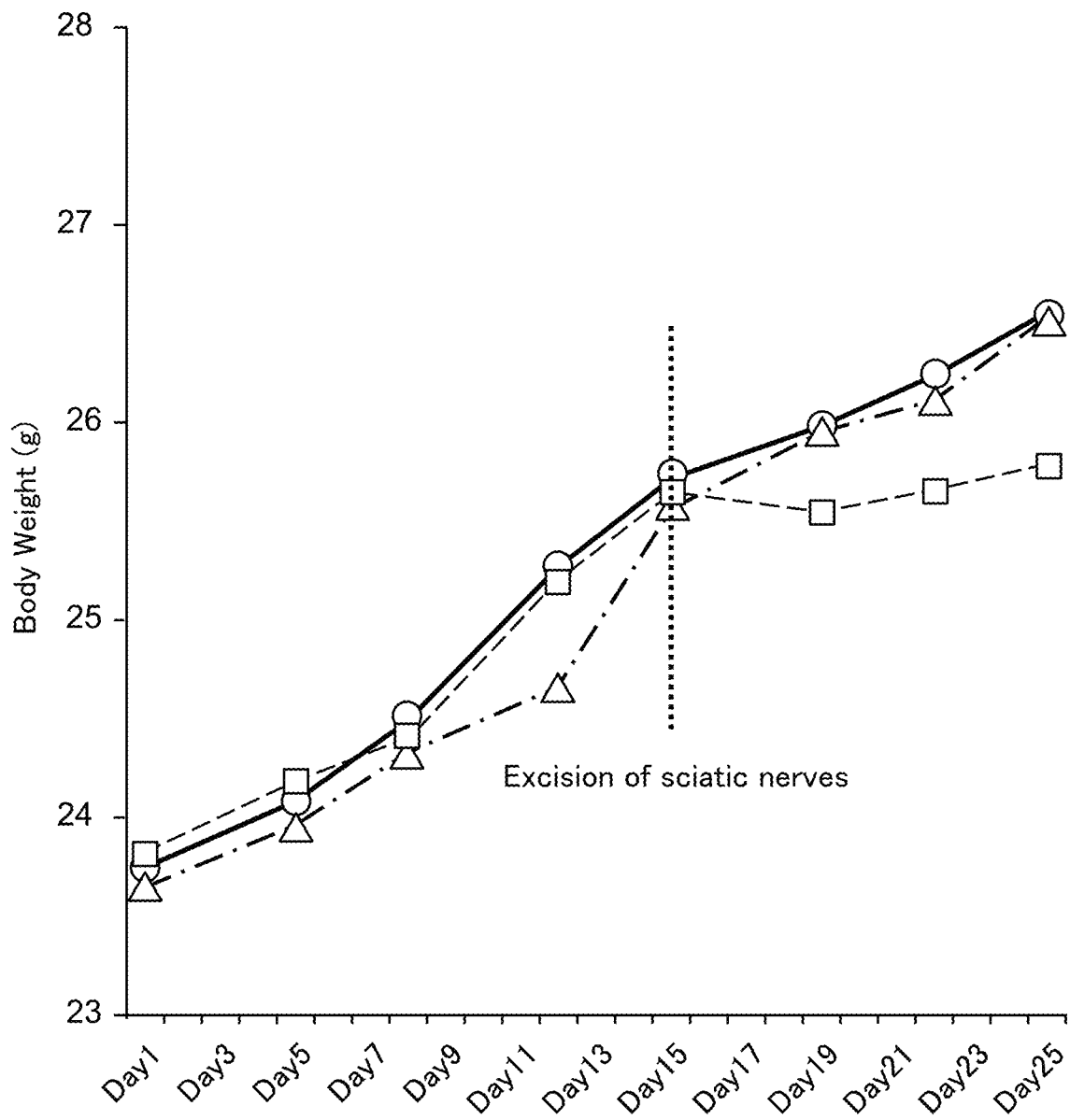
FIG. 8 is a graph showing changes in body weight of mice.

FIG. 8 is a graph showing changes in body weight of mice. The white circle indicates control (C), the white triangle indicates Comparative Example 1, and the white rectangle indicates Example 2. An increase in body weight was observed in each of the mice between before and after the excision of the sciatic nerves with passage of days.

Figure 9:
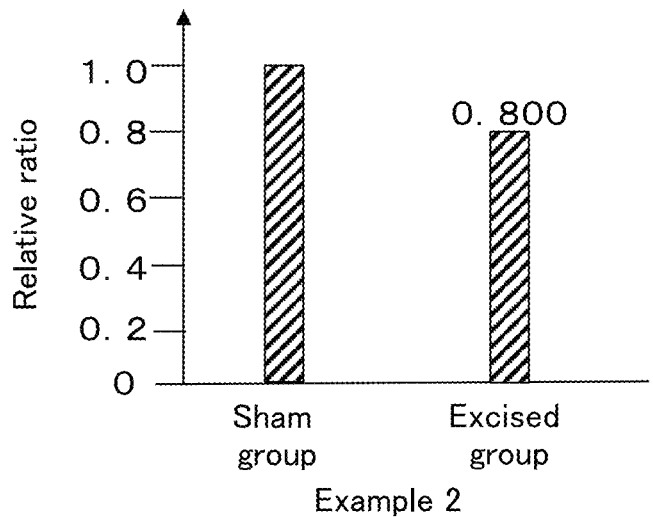
FIG. 9 is a graph showing changes in muscle mass after excision of the sciatic nerves.
Figure 9:
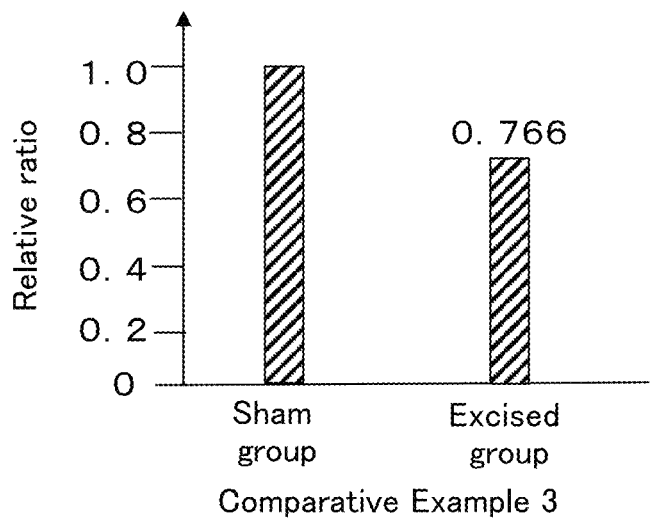
Figure 9:
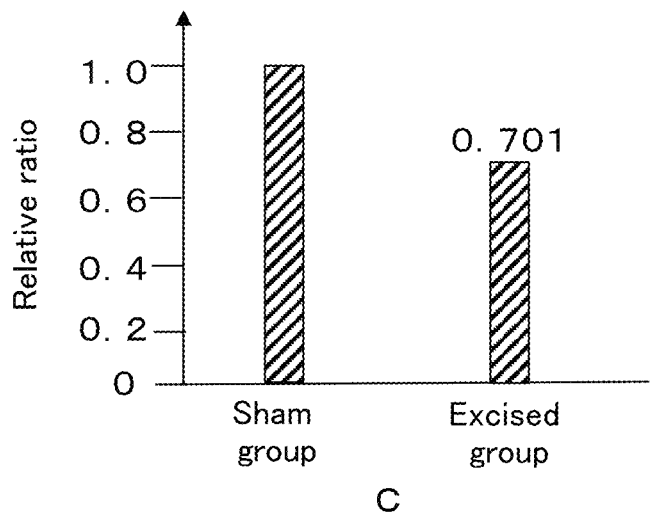

FIG. 9 is a graph showing changes in muscle mass (that is, atrophy of muscles) after the excision of the sciatic nerves. In the present test, the right lower limbs of the mice were set as Sham, and the sciatic nerves were excised in the left lower limbs of the mice. In comparison in muscle mass between the right and left limbs at the time of dissection, changes in muscle mass were evaluated by dividing the muscle mass with that of Sham group. The graph shows relative values with Sham set to be 1. Measurement results used in calculation of the graph are shown in Table 5.

TABLE 5

|  | Example 2 | | Comparative Example 3 | | C | |
| --- | --- | --- | --- | --- | --- | --- |
|  | Sham group | Excised Group | Sham group | Excised Group | Sham group | Excised Group |
| Mass (g) | 0.078 | 0.063 | 0.082 | 0.062 | 0.077 | 0.054 |

The control showed 29.9% atrophy (={(0.077-0.054)/0.077}*100), and Comparative Example 1 showed 23.4% atrophy. On the other hand, Example 2 showed 20.0% atrophy at most. Therefore, it was confirmed that muscle atrophy could be suppressed easily by feeding the sarcopenia-inhibiting food product of the present disclosure.

Evaluation (Evaluation of Muscle Enhancement Based on Fluorescence Images)

In the process of differentiation of muscles, undifferentiated myoblast cells are fused to be differentiated to myotube cells, which are multinuclear cells, and muscle fibers having contractile ability are further formed from matured myotube cells, so that muscles are formed. In the present test, differentiation potentials from myoblast cells to myotube cells owing to addition of the sarcopenia-inhibiting food product of the present disclosure were evaluated. It can be said that the larger the differentiation potential is, the more easily the muscle is enhanced.

First, as cell inoculation, C2C12 cells were inoculated in 24-well plates with a culture medium each in $5 \times 10^4$ cells/well. Subsequently, as differentiation and induction, after 24 hours, the medium was replaced with a differentiation medium, and then, IGF-1, a fermented liquid of Example 1, or an extract of Comparative Example 4 (hereinafter collectively referred to as specimens) was added. The added amount of IGF-1 was 100 ng, the fermented liquid of Example 1 was obtained by fermentation for 48 hours (the sarcopenia-inhibiting food product of the present disclosure), and the extract of Comparative Example 4 was a heated water extract of a dried powder of American *ginseng*. Moreover, after 24 hours, the medium was replaced, and the specimen was added to the medium in the same manner as the first time. Furthermore, after 48 hours, the medium was replaced, and the specimen was added in the same manner as the first time. After the elapse of 24 hours, immunostaining (MHC, DAPI) was conducted and the sample was observed by a fluorescence microscope.

Figure 10:
FIG. 10 is fluorescence images showing evaluation results of muscle enhancement.
Figure 10:
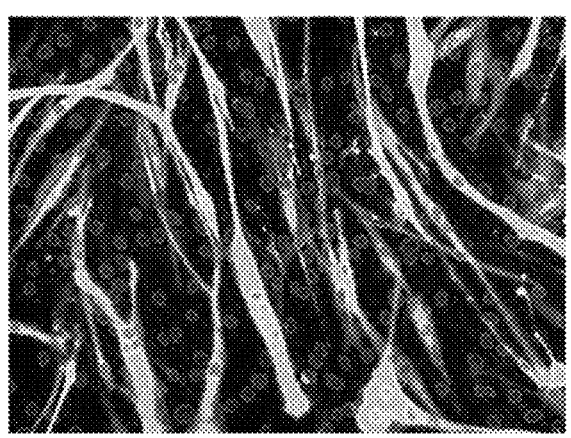
Figure 10:
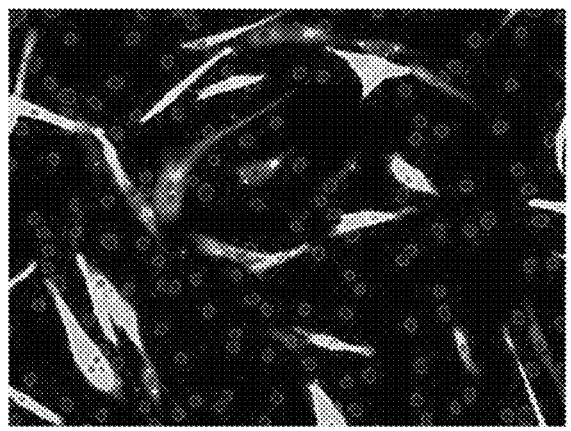
Figure 10:
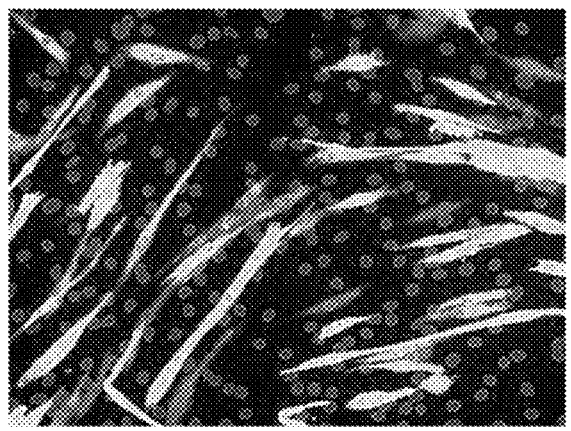

FIG. 10 is fluorescence images showing evaluation results of muscle enhancement. In FIG. 10, "control" (C) shows a sample in which neither of the sarcopenia-inhibiting food product of the present disclosure and IGF-1 was added, and "IGF-1" (I) shows a sample in which 100 ng of IGF-1 was added. "Untreated liquid (10 µg)" (Comparative Example 4) shows a sample in which 10 µg of the extract of Comparative Example 4 was added, and "Fermented liquid (10 µg)" (Example 1) shows a sample in which 10 µg of the fermented liquid of Example 1 was added.

In each image, the larger the area of the white or light gray portions (hereinafter referred to as portions of white or the like, portions of a fluorescent color in the fluorescence image) was, the more the myotubes were, and it can be determined that the muscle was enhanced. When C and Comparative Example 4 are compared, the portions of white or the like are dispersed similarly. On the other hand, as shown in I, it can be seen that the addition of IGF-1 increased portions of white or the like and thus enhanced the muscle. As shown in Example 1, it can be seen that in the case where the sarcopenia-inhibiting food product of the present disclosure was added, the portions of white or the like were increased more than C and Comparative Example 4 but not as much as in I though.

Figure 11:
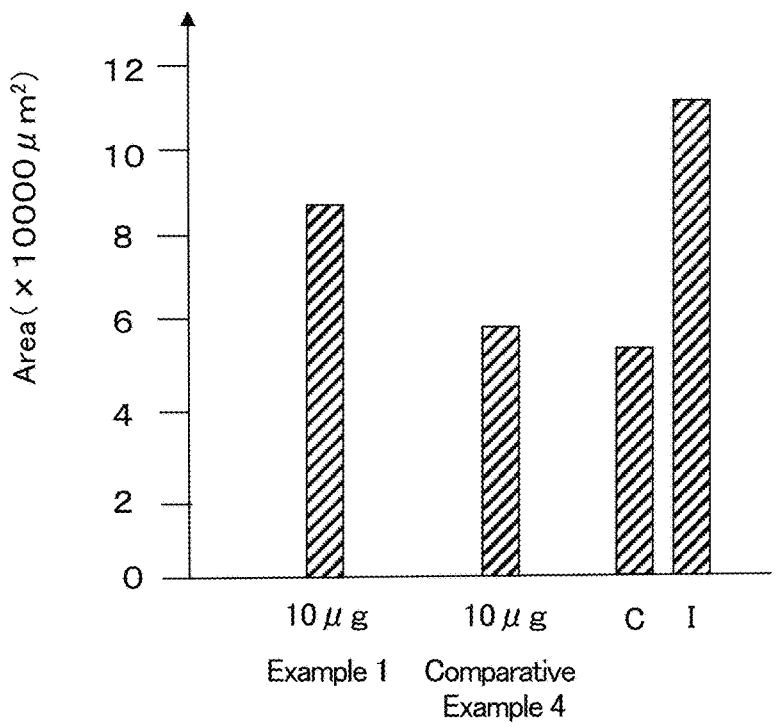
FIG. 11 is a graph showing muscle masses indicating evaluation results of muscle enhancement.

FIG. 11 is a graph showing muscle masses indicating the evaluation results of muscle enhancement. The measured areas are shown in Table 6 given below, and the FIG. 11 is obtained by making Table 6 into a graph.

TABLE 6

|  | Example 1 | Comparative Example 4 | C | I |
|---|---|---|---|---|
| Added amount (µg) | 10 | 10 | — | — |
| Average value | 87553.33 | 58182.33 | 54385.89 | 110735.33 |

In Example 1 and Comparative Example 4 each, 10 µg was added. Comparative Example 4 is substantially the same as C in consideration of measurement errors, and it can be determined that there is no muscle-enhancing effect in Comparative Example 4. On the other hand, it was acknowledged that although it was not comparable to I, in Example 1, the muscle mass was significantly increased as compared with Comparative Example 4 and I. Therefore, it was confirmed that the sarcopenia-inhibiting food product of the present disclosure and the muscle-enhancing food product of the present disclosure had muscle-enhancing effects.

Evaluation (Muscle-Enhancing Effect, Check of Muscle Differentiation Marker)

The expression level of the muscle differentiation marker (MyoD) was measured. Cell inoculation and differentiation and induction were conducted in the same manner as in ". Evaluation (Muscle Enhancement Evaluation Based on Fluorescence Image)" except that $2.5 \times 10^5$ cells were inoculated in a petri dish having a diameter of 60 mm with a culture medium. The expression level of the muscle differentiation marker was measured by using RT-PCR.

Figure 12:
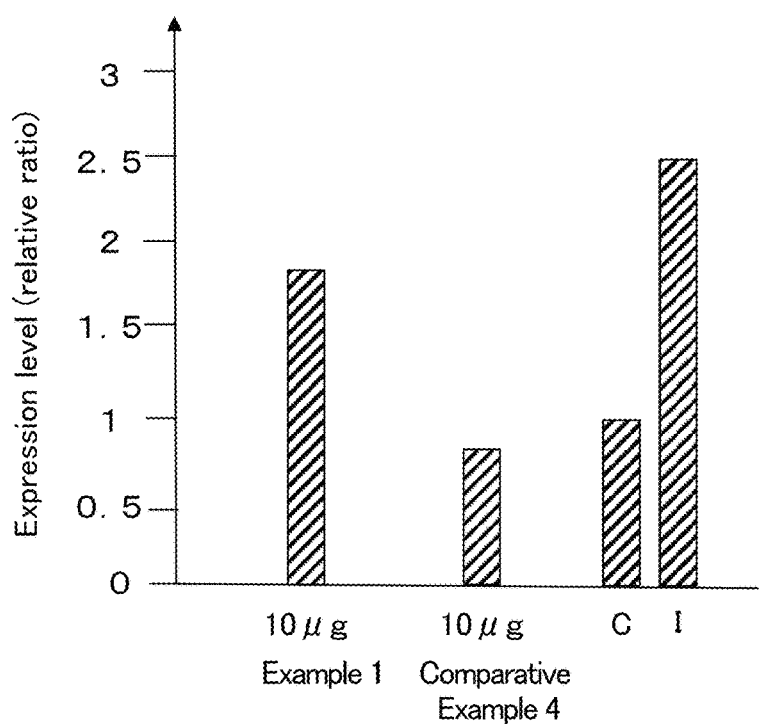
FIG. 12 is a graph showing expression levels of a muscle differentiation marker.

FIG. 12 is a graph showing expression levels of a muscle differentiation marker. The measured expression levels are shown in Table 7 given below, and FIG. 12 is obtained by making Table 7 into a graph. It can be determined that the larger the numerical value was, the more the muscle differentiation proceeded.

TABLE 7

|  | Example 1 | Comparative Example 4 | C | I |
|---|---|---|---|---|
| Added amount (µg) | 10 | 10 | — | — |
| MyoD | 1.82 | 0.80 | 1.00 | 2.55 |

With measurement errors taken into consideration, Comparative Example 4 and C are substantially equal, and it can be considered that there was no increase in differentiation marker due to the addition. However, in the case of the addition of 10 µg of the fermented liquid of Example 1, a significant increase in differentiation marker was acknowledged. For this reason, it was confirmed that the sarcopenia-inhibiting food product of the present disclosure and the muscle-enhancing food product of the present disclosure had muscle-enhancing effects together with the results of the above FIG. 11.

Evaluation (Test for Confirming Advantageous Effects of Other Muscle Enhancement)

As the muscle-enhancing food product of the present disclosure, the powder of the above Example 2 was prepared. As test animals, 24 C57BL/6J mice were prepared and divided into groups of eight mice each. To each group, by using the same powder feed, a feed obtained by mixing the powder of Example 2 in a ratio of 3% by mass, a feed obtained by mixing the powder of Comparative Example 1 (the powder of American *ginseng* not fermented) in a ratio of 3% by mass, and the powder feed only were fed during the test period.

The test period was set to 58 days after the acclimation of one week, and each mouse was allowed to orally take in the samples during the 58 days. During the 58 days, the body weight and grip strength were measured every day. The grip strength was measured by measuring a pulling force on a string pulled by the mice with the front legs caused by applying stimulus to the mice, and the measurement was conducted on each mouse three times, and an average value and a maximum value of these were measured.

On the 58th day, the mice were dissected to measure the muscle mass and the fat mass. The muscle mass was measured by separately collecting the muscles of the front side and back side of the back legs and measuring the total mass of each. The muscles on the front side were the tibialis anterior muscle, the extensor digitorum longus muscle, and the peroneus longus muscle, and the muscles on the back side were the gastrocnemius muscle and the soleus muscle.

Figure 13:
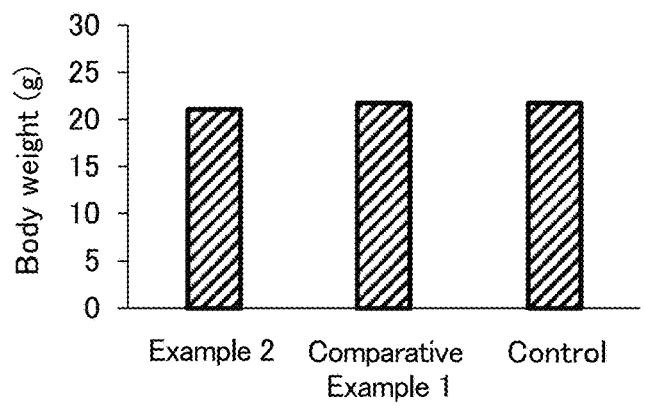
FIG. 13 is a graph showing body weights of mice on the 1st day of the test.

FIG. 13 is a graph showing the body weights of the mice on the 1st day of the test. Example 2 shows a mouse fed with a feed which was mixed with the powder of Example 2, Comparative Example 1 shows a mouse fed with a feed which was mixed with the powder of Comparative Example 1, and control shows a mouse fed with a powder feed which was not mixed with the powder of Example 2 or Comparative Example 1. The same applies below. On the 1st day, the body weight of the mouse of Example 2 was 21.08 g, the body weight of the mouse of Comparative Example 1 was 21.71 g, and the body weight of the mouse of control was 21.59 g.

Figure 14:
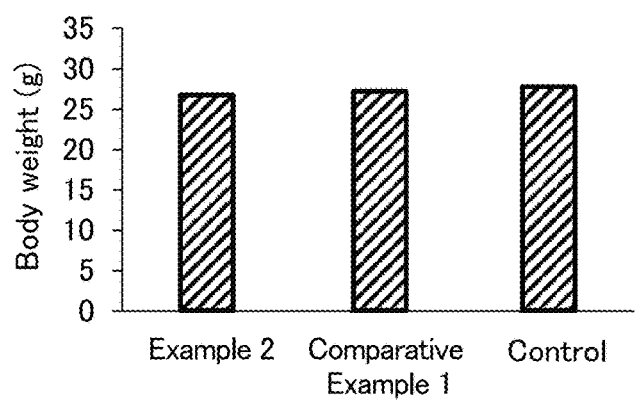
FIG. 14 is a graph showing the body weights of the mice on the 58th day of the test.

FIG. 14 is a graph showing the body weights of the mice on the 58th day of the test. On the 58th day, the body weight of the mouse of Example 2 was 26.72 g, the body weight of the mouse of Comparative Example 1 was 27.30 g, and the body weight of the mouse of control was 27.82 g.

Figure 15:
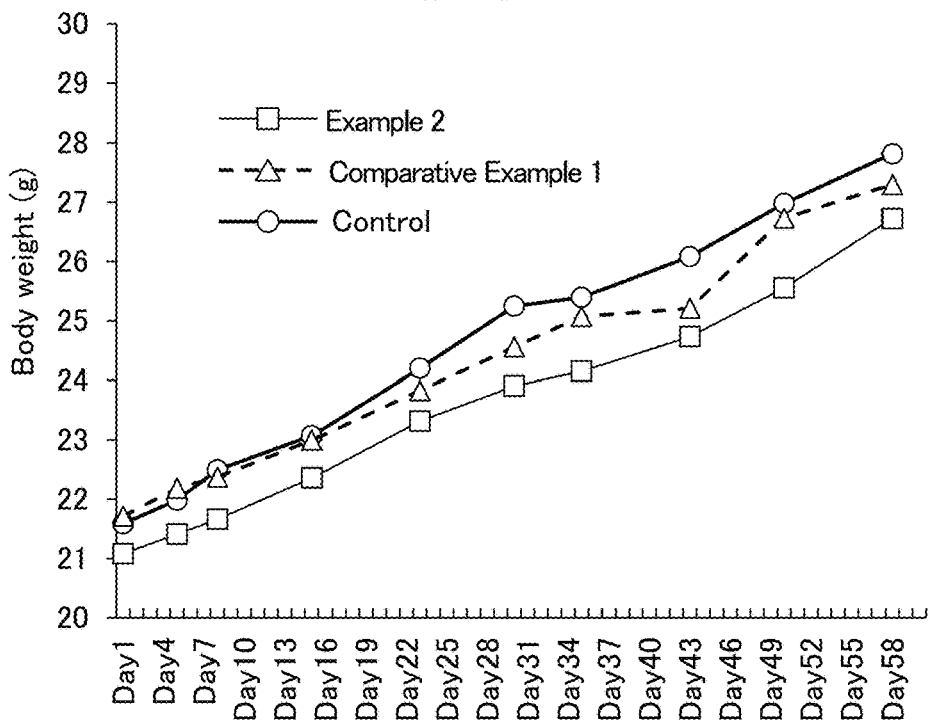
FIG. 15 is a graph showing changes in body weights of the mice during the test period.

FIG. 15 is a graph showing changes in body weights of the mice during the test period. The rectangle plot indicates the mouse of Example 2, the triangle plot indicates the mouse of Comparative Example 1, and the circle plot indicates the mouse of control. The meaning of each plot applies to the following graphs as well. In all of the mice, an increase in body weight was observed during the test period. Therefore, it was confirmed that the feed containing the powder of Example 2 or the powder of Comparative Example 1 could be taken in on a daily basis and was excellent in safety as well in the same manner as the normal feed of control which was mixed with nothing.

Figure 16:
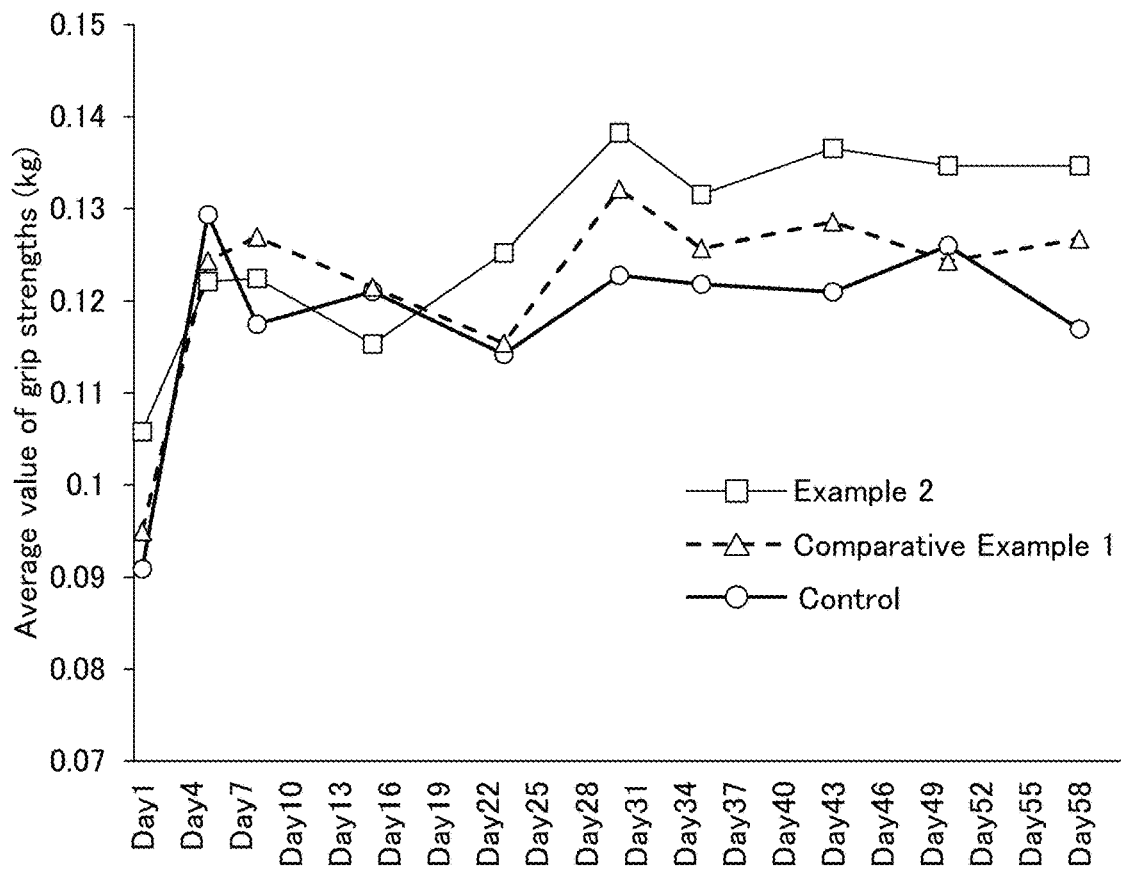
FIG. 16 is a graph showing changes with time of average values of grip strengths.

FIG. 16 is a graph showing changes with time of average values of grip strengths. Since each group included eight mice, the graph shown in FIG. 16 was obtained by making average values of the eight mice in each group into a graph. The same applies to the graph shown in FIG. 18, which will be described later.

The same tendency was observed in each mouse during the test period. Specifically, the grip strength abruptly increased from the 1st day to the 5th day, and then the grip strength was remained at substantially the same level after the 6th day. Regarding the magnitude relationship among the grip strengths of the mice, the grip strength of each mouse was at substantially the same level until the 15th day, but the grip strengths of the mice of Example 2 were always the largest after the 16th day. Regarding the grip strengths of the mice of Comparative Example 1 and the grip strengths of the mice of control, the grip strengths of the mice of Comparative Example 1 were generally larger. However, on the 49th day, the grip strengths of the mice of control became larger. For this reason, it was suggested that the relationship between the grip strengths of the mice of Comparative Example 1 and the grip strengths of the mice of control was not stable, and it cannot be said which was larger.

Figure 17:
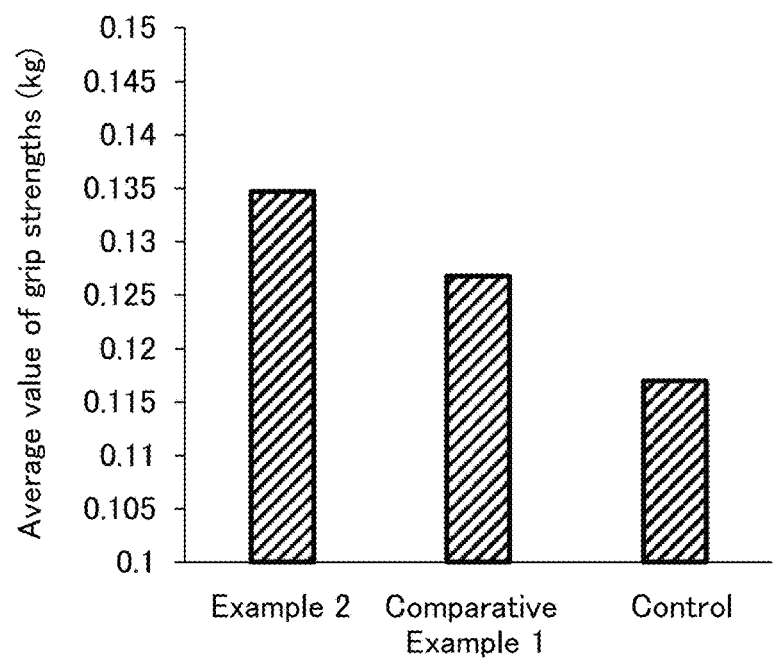
FIG. 17 is a graph showing results on the 58th day regarding the average values of the grip strengths.

FIG. 17 is a graph showing results on the 58th day regarding the average values of the grip strengths. The average value of the grip strengths of the mice of Example 2 was 0.135 kg, the average value of the grip strengths of the mice of Comparative Example 1 was 0.127 kg, and the average value of the grip strengths of the mice of control was 0.117 kg. From this result, it can be seen that the average value of the grip strengths of the mice which took in the feed of Example 2 for 58 days became larger than those of the mice of Comparative Example 1 and the mice of control. In particular, together with the graph shown in the above FIG. 16 taken into consideration, it can be seen that the average value of the grip strengths stably increased in the mice which orally took in the muscle-enhancing food product of the present disclosure.

Figure 18:
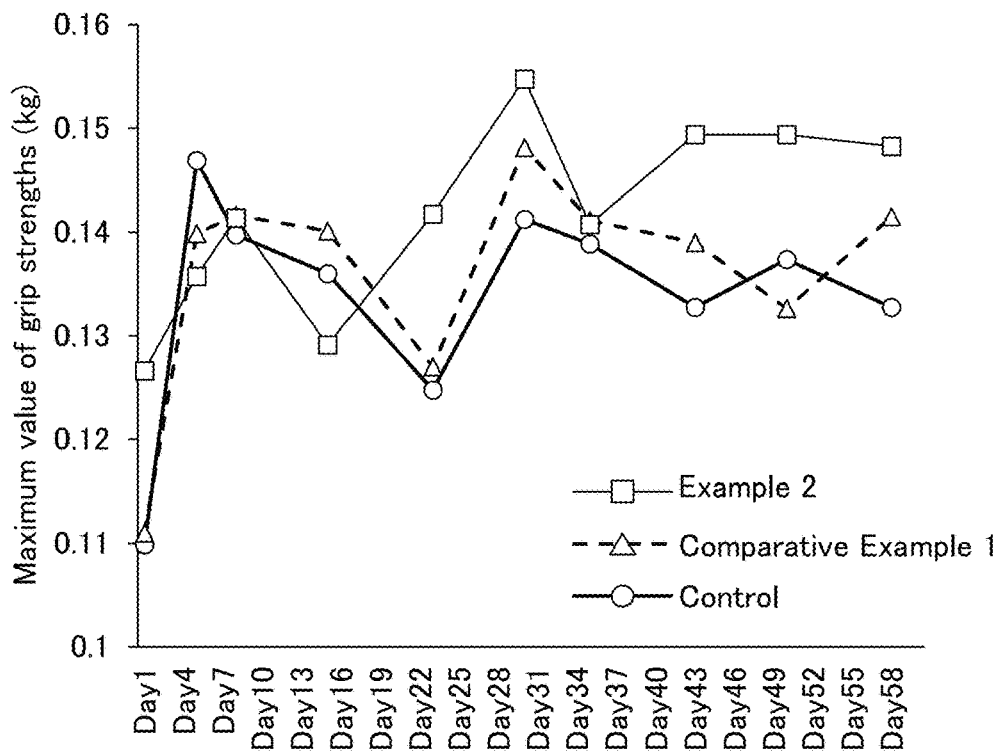
FIG. 18 is a graph showing changes with time of the maximum values of the grip strengths.

FIG. 18 is a graph showing changes with time of the maximum values of the grip strengths. Since each group included eight mice as described above, the graph shown in FIG. 18 was obtained by making the maximum value of the eight mice in each group into a graph.

In the graph shown in FIG. 18 as well, the maximum values of the grip strengths generally showed similar tendencies to the average values of the grip strengths shown in FIG. 16 described above. On the 34th day, the grip strength of the mice of Example 2 became lower than the grip strength of the mice of Comparative Example 1. However, after the 35th day, including the 35th day, the grip strength of the mice of Example 2 was always higher than the grip strengths of the mice of Comparative Example 1 and control. On the other hand, regarding the grip strengths of the mice of Comparative Example 1 and control, the grip strength of the mice of Comparative Example 1 was generally higher, but was generally at a similar level. On the 49th day, which is in a final phase of the test period, the grip strength of the mice of control became lager, but on the 58th day, the grip strength of the mice of Comparative Example 1 became larger again.

Figure 19:
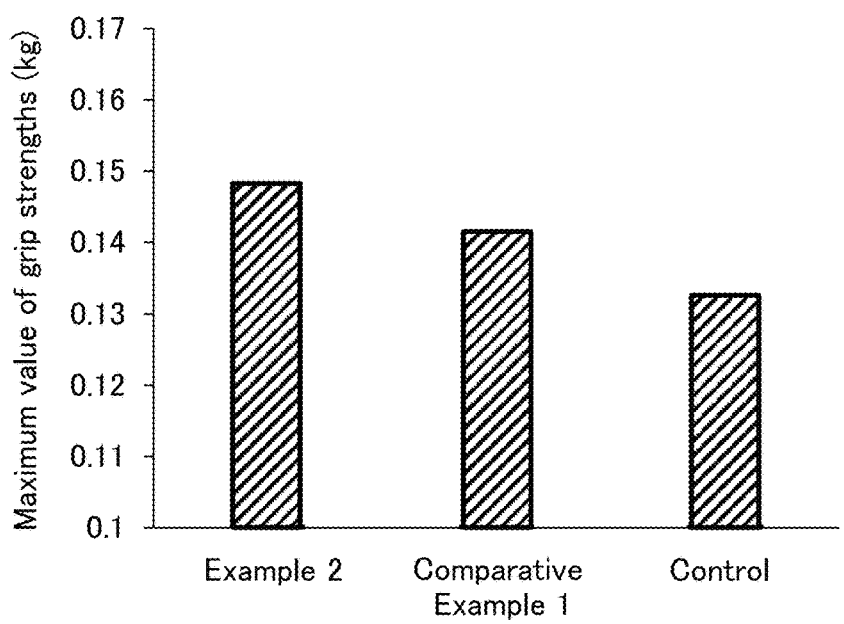
FIG. 19 is a graph showing results on the 58th day regarding the maximum values of the grip strengths.

FIG. 19 is a graph showing results on the 58th day regarding the maximum values of the grip strengths. The average value of the grip strengths of the mice of Example 2 was 0.148 kg, the average value of the grip strengths of the mice of Comparative Example 1 was 0.142 kg, and the average value of the grip strengths of the mice of control was 0.133 kg. From this result, it can be seen that the maximum value of the grip strengths of the mice which took in the feed of Example 2 for 58 days became larger than those of the mice of Comparative Example 1 and the mice of control. In particular, together with the graph shown in the above FIG. 18 taken into consideration, it can be seen that the maximum value of the grip strengths stably increased in the mice which orally took in the muscle-enhancing food product of the present disclosure.

The grip strength can happen to be instantly increased for some reason. However, such a phenomenon does not continuously occur. As shown in FIG. 16 to FIG. 19, it is considered that by orally feeding the muscle-enhancing food product of the present disclosure, the muscle could be stably and continuously enhanced, and as a result of this, the grip strengths were maintained always at a higher level than the mice of Comparative Example 1 and control.

FIG. 20 is a graph showing total masses of the tibialis anterior muscle, the extensor digitorum longus muscle, and the peroneus longus muscle. As described above, these muscles are muscles on the front side. Since each group included eight mice as described above, the graph shown in FIG. 20 was obtained by making the average value of the eight mice in each group into a graph. The graph shown in FIG. 20 shows relative values in the case where control was considered as 1. These points apply to graphs shown in FIG. 21 and FIG. 22, which will be described later. The muscles of the mice of Example 2 were 1.069, and the muscles of the mice of Comparative Example 1 were 0.988.

FIG. 21 is a graph showing total masses of the gastrocnemius muscle and the soleus muscle. As described above, these muscles are muscles on the back side. The muscle mass of the mice of Example 2 was 1.029, and the muscle mass of the mice of Comparative Example 1 was 1.012. Therefore, the fat mass of the mice of Example 2 was larger than those of the mice of Comparative Example 1 and control.

As shown in FIG. 20 and FIG. 21, the muscles of the mice of Example 2 were larger than those of the mice of Comparative Example 1 and control on each of the front and back sides. This result is a result that corroborates that the average value and the maximum value of the grip strengths of the mice of Example 2 became larger than those of the mice of Comparative Example 1 and control as shown in the above FIG. 16 to FIG. 19.

FIG. 22 is a graph showing fat masses. The fat mass of the mice of Example 2 was 0.953. Therefore, the fat mass of the mice of Example 2 decreased more than that of the mice of control. Since an increase of muscles increases the metabolism, the amount of fat decreases. For this reason, this result is a result that corroborates that the muscle of the mice of Example 2 increased more than that of the mice of control as shown in the above FIG. 20 and FIG. 21.

As described above, by orally feeding the muscle-enhancing food product of the present disclosure, an increase in muscle mass was also confirmed. Therefore, according to the muscle-enhancing food product of the present disclosure, a muscle-enhancing effect can be achieved in addition to the sarcopenia-inhibiting effect.

REFERENCE SIGNS LIST

S1 raw material preparation step
S2 fermentation step
S3 property adjustment step

The invention claimed is:

1. A method for producing a food product, comprising:
producing a food product through fermentation of American *ginseng* using a microbial group containing
Bifidobacterium longum,
Bifidobacterium bifidum,
Bifidobacterium adolescentis,
Lactobacillus acidophilus,
Lactobacillus paracasei subsp. *paracasei,*
Lactobacillus gasseri,
Lactobacillus delbrueckii subsp. *bulgaricus,*
Lactobacillus helveticus,
Lactobacillus casei subsp. *casei,*
Lactobacillus rhamnosus,
Lactobacillus delbrueckii subsp. *delbrueckii,*
Streptococcus thermophilus,
Lactobacillus brevis,
Lactobacillus jensenii,
Lactococcus lactis, and
Enterococcus faecium.

2. The method for producing a food product according to claim 1, wherein
the fermentation is conducted for 36 hours or more and 120 hours or less.

* * * * *